(12) United States Patent
Deak et al.

(10) Patent No.: US 9,715,959 B2
(45) Date of Patent: Jul. 25, 2017

(54) PERMANENT MAGNET SUITABLE FOR MAGNETIC ANGLE ENCODER

(71) Applicant: MultiDimension Technology Co., Ltd., Zhangjiagang (CN)

(72) Inventors: James Geza Deak, Zhangjiagang (CN); Zhimin Zhou, Zhangjiagang (CN)

(73) Assignee: MultiDimension Technology Co., Ltd., Zhangjiagang (CN)

( * ) Notice: Subject to any disclaimer, the term of this patent is extended or adjusted under 35 U.S.C. 154(b) by 8 days.

(21) Appl. No.: 14/758,447

(22) PCT Filed: Jan. 3, 2014

(86) PCT No.: PCT/CN2014/070086
§ 371 (c)(1),
(2) Date: Jun. 29, 2015

(87) PCT Pub. No.: WO2014/106471
PCT Pub. Date: Jul. 10, 2014

(65) Prior Publication Data
US 2015/0332831 A1   Nov. 19, 2015

(30) Foreign Application Priority Data
Jan. 5, 2013  (CN) .......................... 2013 1 0002591

(51) Int. Cl.
*H01F 7/02* (2006.01)
*H01F 1/06* (2006.01)
(Continued)

(52) U.S. Cl.
CPC ............ *H01F 7/021* (2013.01); *G01D 5/145* (2013.01); *H01F 1/047* (2013.01); *H01F 1/0551* (2013.01); *H01F 1/06* (2013.01); *H01F 7/0289* (2013.01)

(58) Field of Classification Search
CPC ..... G01D 5/145; H01F 7/0289; H01F 1/0551; H01F 1/06; H01F 1/047; H01F 7/021
See application file for complete search history.

(56) References Cited

U.S. PATENT DOCUMENTS 6,084,401 A * 7/2000 Palma ................ G01D 5/145
324/207.21
6,310,473 B1 * 10/2001 Zhao .................. G01D 5/145
324/207.2

(Continued)

FOREIGN PATENT DOCUMENTS

| CN | 1271416 | 10/2000 |
| CN | 203300354 | 11/2013 |

(Continued)

OTHER PUBLICATIONS

"International Application No. PCT/CN2014/070086, International Preliminary Report on Patentability dated Jul. 7, 2015", (w/ English Translation), 15 pgs.

(Continued)

*Primary Examiner* — Mohamad Musleh
(74) *Attorney, Agent, or Firm* — Schwegman Lundberg & Woessner, P.A.

(57) ABSTRACT

The present invention relates to a permanent magnet suitable for a magnetic angle encoder. The permanent magnet has an annular cylindrical structure and comprises a first permanent magnet unit and a second permanent magnet unit. The first permanent magnet unit and the second permanent magnet unit are geometrically symmetrical with respect to a diametral cross section. The magnetization intensity of the first permanent magnet unit and the magnetization intensity of the second permanent magnet unit are parallel to the axial direction of the annular cylinder and are in opposite directions, or the magnetization intensity of the first permanent magnet unit and the magnetization intensity of the second (Continued)

permanent magnet unit are perpendicular to the diametral cross section and are parallel to one another and in the same direction.

20 Claims, 11 Drawing Sheets

(51) Int. Cl.
*H01F 1/047* (2006.01)
*H01F 1/055* (2006.01)
*G01D 5/14* (2006.01)

(56) References Cited

U.S. PATENT DOCUMENTS

| | | |
|---|---|---|
| 6,762,897 B1 | 7/2004 | Kabashima et al. |
| 2002/0011837 A1* | 1/2002 | Sato ........................ G01D 5/145 324/207.2 |
| 2008/0231262 A1* | 9/2008 | Wolf ........................ G01D 5/145 324/207.2 |
| 2009/0078484 A1* | 3/2009 | Kocijan .................. B60L 13/04 180/167 |
| 2009/0083951 A1* | 4/2009 | Maurer ............... E05B 73/0017 24/303 |
| 2010/0060267 A1* | 3/2010 | Wagner .................. G01D 5/145 324/207.2 |

FOREIGN PATENT DOCUMENTS

| | | |
|---|---|---|
| JP | H0328407 | 12/1991 |
| JP | 2000308326 | 11/2000 |
| WO | WO-2014106471 | 7/2014 |

OTHER PUBLICATIONS

"International Application No. PCT/CN2014/070086, Written Opinion mailed May 6, 2014", (w/ English Translation), 13 pgs.

"International Application No. PCT/CN2014/070086, International Search Report mailed May 6, 2014", (May 6, 2014), 6 pgs.

* cited by examiner

PERMANENT MAGNET SUITABLE FOR MAGNETIC ANGLE ENCODER

PRIORITY CLAIM TO RELATED APPLICATIONS

This application is a U.S. national stage application filed under 35 U.S.C. §371 from International Application Serial No. PCT/CN2014/070086, which was filed 3 Jan. 2014, and published as WO 2014/106471 on 10 Jul. 2014, and which claims priority to Chinese Application No. 201310002591.1, filed 5 Jan. 2013, which applications and publication are incorporated by reference as if reproduced herein and made a part hereof in their entirety, and the benefit of priority of each of which is claimed herein.

TECHNICAL FIELD

The present invention relates to a type of permanent magnet used for positional measurements, in particular, to a permanent magnet suitable for use in magnetic angle encoders, and instrumentation such as an electronic water meter that utilizes a magnetic angle encoder.

BACKGROUND

With the rapid development of sensor technology, the traditional mechanical flow meter, such as a residential water meter, has been gradually transitioning to a new electronic form. To this end, various sensor technologies have been employed, including optical encoder technology, which can be used to build an absolute angle encoder to enable the production of a direct read or absolute encoder water meter, which does not require an incremental encoder, to measure the amount of liquid flowing through the water meter. Unfortunately this technology suffers from digital errors, resulting from bubbles, light, dirt, leakage and other factors. Compared with optical encoder technology, magnetic encoding technology has higher resolution, no digital error phenomenon, good stability, and can completely eliminate the faults inherent in photovoltaic technology. Magnetic angle encoder technology is a good choice for a direct read water meter, and a good implementation uses magnetoresistive sensors such as tunneling magnetoresistive angle sensors to sense the rotation angle of a magnetic field produced by a cylindrical ring permanent magnet mounted on the counting wheels, such that the angle of the field represents the value of the wheel, and the angle signal from the sensor is converted to a digital readout using simple electronic components.

Magnetic angle measurement accuracy depends on the performance characteristics of two components of a magnetic angle encoder, and these are the magnetic sensor and the permanent magnet. Compared with Hall sensors, magnetoresistive sensors such as tunneling magnetoresistive sensors have better magnetic field sensitivity, lower power consumption, and smaller size. A tunneling magnetoresistive angular displacement sensor may comprise two mutually orthogonal tunneling magnetoresistive sensors. The tunneling magnetoresistive angle sensor produces two outputs from the magnetic field of the rotating permanent magnet, representing the sine and the cosine of the orientation angle $\phi$ of the magnetic field generated by the permanent magnet, and these components can be used to calculate the angle using the following relationships:

$OUT1=COS(\phi)$ $OUT2=SIN(\phi)$

The inverse tangent function can then be used to calculate the angle $\phi$ of the rotating magnetic field from the magnetoresistive angle sensor outputs OUT1 and OUT2:

$\phi = A\ TAN(OUT2/OUT1)$.

When the permanent magnet rotates by angle $\alpha$, the magnetic field produced by the permanent magnet passes through and is detected by the tunneling magnetoresistive sensors located a point defined by r and an angle. When the angle of the magnet $\alpha$ and the angle of the magnetic field $\phi$ form a linear relationship in the range of 0~360°, then the angle $\phi$ of the magnetic field detected by the tunneling magnetoresistive sensor represents the mechanical angle $\alpha$ of the permanent magnet. When for example, the 10 positions on a counting wheel are represented by numbers 0-9 on the circumference of the wheel and spaced in 10 equal angular increments, defined by dividing the range of $\alpha$ into 10 intervals, then each angular interval represents a specific digit. In this manner by combining a permanent magnet angle encoder with electronics to transform the signals into an appropriate output format, a direct read water meter may be realized.

When tunneling magnetoresistive angle sensor encoder technology is applied to electronic water meter design there will be special performance and design requirements for the permanent magnets, which are difficult to meet with existing magnetic encoder technology due to the following issues:

(1) Existing magnetic angle encoders mostly use Hall sensors to detect the magnetic field generated by the permanent magnet that is perpendicular to the surface of the sensor, and tunneling magnetoresistive sensors detect the magnetic field component parallel to the surface of the sensor, so existing permanent magnet designs are not compatible with the tunneling magnetoresistive sensors.

(2) The existing permanent magnets used for magnetic angle encoders are usually a solid cylindrical design, and this is not compatible with the counting wheels used in typical water meters since the counting wheels are mounted on an axle that needs to pass through the center of each wheel and thus through the magnets.

SUMMARY OF THE INVENTION

The purpose of the present invention is to overcome the above drawbacks of the prior art in order to provide a suitable permanent magnet for a magnetic angle encoder, so that it can be installed within the counting wheel of an electronic water meter, while minimizing space and satisfying the requirements of tunneling magnetoresistive sensors, such that the rotating magnetic field component near the inner surface of the rotating permanent magnet has an angle $\phi$ that is linearly related to the physical rotation angle $\alpha$ of the permanent magnet, thus improving the angle measurement accuracy of the magnetic encoder.

According to one aspect of the present invention, in order to provide a suitable permanent magnet for the magnetic angle encoder, the permanent magnet has an cylindrical ring structure, comprising a first permanent magnet unit and a second permanent magnet unit, the first permanent magnet unit and a second permanent unit are located on opposites sides of a diametral the cross-section, and the permanent magnet diametral cross-section is defined by the outer diameter and the axial length of the permanent magnet.

The first permanent magnet unit's magnetization and said second permanent magnet's magnetization are polarized in a direction along the axial direction of the permanent magnet, but they are aligned in opposite directions, or, Said first and second permanent magnet units have their magnetization directions aligned perpendicular to a diametral cross-section of the permanent magnet in the same direction.

Preferably, the magnetization magnitude of the first and second permanent magnet units is the same value.

Preferably, the outer diameter of the cylindrical permanent magnet ring structure is 3-200 mm.

Preferably, the inner diameter of the cylindrical permanent magnet ring structure is 1-100 mm.

Preferably, the axial length of the columnar structure of the cylindrical ring permanent magnet is 1-50 mm.

Preferably, the circular faces at the ends of the cylindrical ring permanent magnets are positioned parallel to a detection plane.

Preferably, the distance between the detection plane and the circular end surface of the cylindrical ring permanent magnet is in the range of 1-5 mm.

Preferably, the magnetic field of the permanent magnets has a component parallel to the detection plane.

Preferably the detection plane is located at the inner surface of the permanent magnet at a radial distance from the rotational axis, such that the magnetic field components in this detection zone define an angle that is linearly proportional to the physical rotation angle of the permanent magnet.

Preferably, the permanent magnet is composed of Alnico.

Preferably, the composition of the material, the permanent magnet is a ferrite ceramic material $MO6Fe_2O_3$, where M is Ba, Sr or combinations of both.

Preferably, the permanent magnet is composed one or more of the following materials categories including $RECo_5$, where RE=Sm and/or Pr; $RE_2TM_{17}$, where RE=Sm, TM=Fe, Cu, Co, Zr and/or Hf; and $RE_2TM_{14}B$, where RE=Nd, Pr, and/or Dy, TM=Fe and/or Co.

Preferably, the permanent magnet is composed of an alloy containing NbFeB or FeCrCo.

More preferably, the permanent magnets are comprised of permanent magnet powder embedded in plastic, rubber, or a resin composite.

The present invention has the following beneficial effects:
1) the cylindrical ring permanent magnet structure is simple and can be embedded directly into existing counting wheel structures, saving space.
2) the cylindrical ring permanent magnets used in the present invention comprise two simple permanent magnet units, and the magnetization configuration is easy to implement.
3) the cylindrical ring permanent magnets used in the present invention produce a magnetic phase angle in the detection plane that is linearly related to the mechanical rotation angle of the permanent magnet, as required when using magnetoresistive sensors to detect the magnetic field orientation.
4) the cylindrical ring permanent magnets used in the present invention allow the distance from the end face of the permanent magnet to the detection plane within a specific area of the detection plane to vary over a wide range, so that the performance of the tunneling magnetoresistive sensor is less sensitive to the precise position of the sensor.
5) the magnetic angle encoder of the present invention implemented as a water meter permits smaller size and better measurement accuracy.

DESCRIPTION OF THE PREFERRED EMBODIMENTS

The figures and specific examples provided below will be used to describe detailed embodiments of the present invention.

Example 1

Figure 1:
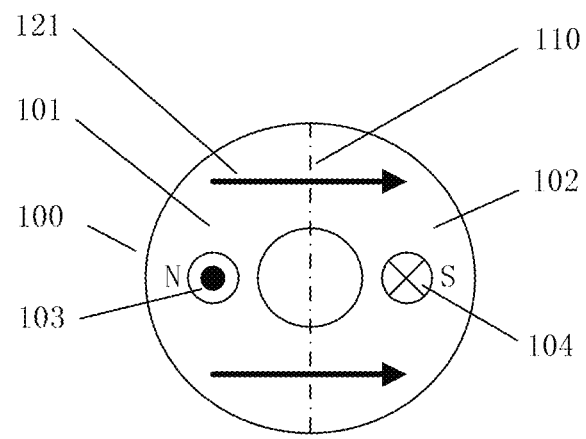
FIG. 1 is a top view of the permanent magnet of Example 1 of the present invention.
Figure 2:
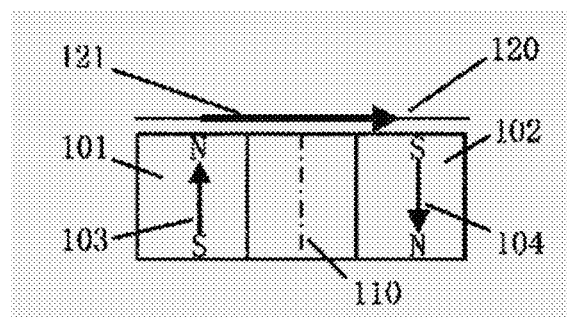
FIG. 2 is a Cross-sectional side view of the permanent magnet shown in FIG. 1.

FIGS. 1 and 2 show schematic drawings of an embodiment of the permanent magnet 100 according of the present invention. The permanent magnet 100 has cylindrical ring geometry, and it is comprised of a permanent unit 101 and a permanent magnet unit 102, wherein permanent magnet unit 101 and permanent magnet unit 102 are symmetrically arranged about diametral cross-section 110. The magnetization directions 103 and 104 of permanent magnet units 101 and 102 are oriented in antiparallel directions along the axis. Preferably, the magnetization 103 of the permanent magnet unit 101 and the magnetization 104 of permanent magnet unit 102 have the same magnitude.

Those skilled in the art can design the permanent magnet 100 into any desired size. Preferably, the permanent magnet 100 is a cylindrical ring with inner diameter 1-100 mm, outer diameter of 3-200 mm, and has an axial length of 1-50 mm.

The detection plane 120 is located adjacent and parallel to the end face or permanent magnet 100. Preferably, the detection plane 120 is separated from the the end surface of the cylindrical ring by a distance of 1-5 mm. In this patent, the permanent magnet 100 produces a magnetic field component 121 in the detection plane 120. Herein, the portion of the detection plane 120 corresponding to the particular detector region 122 located within a certain radial distance from the axis, in particular the magnetic field components 121 within this detection area will have an angle that varies linearly with respect to the angle of the permanent magnet 100, which will be specifically described hereinafter.

Preferably, the composition of the permanent magnet material 100 is Alnico. Alternatively, the composition of the permanent magnet 100 is a ferrite ceramic material such as $MO \cdot 6Fe_2O_3$, M is Ba, Sr or combinations of both. Alternatively, the composition of the permanent magnet 100 is RECo 5, RE=Sm and/or Pr; $RE_2TM_{17}$, RE=Sm, TM=Fe, Cu, Co, Zr and/or Hf; or $RE_2TM_{14}B$, RE=Nd, Pr, and/or Dy, TM=Fe and/or Co. Alternatively, the permanent magnet material 100 composed of an alloy of NbFeB or FeCrCo. Alternatively, the permanent magnet 100 is composed of the permanent magnet powder embedded in plastic, rubber, or resin composite.

Example 2

Figure 3:
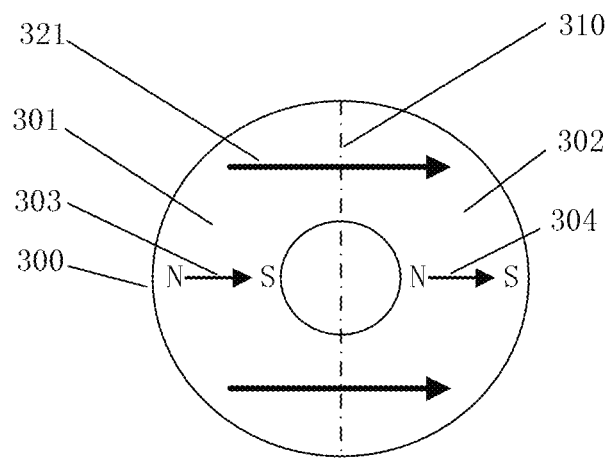
FIG. 3 is a top view of the permanent magnet of Example 2 of the present invention.
Figure 4:
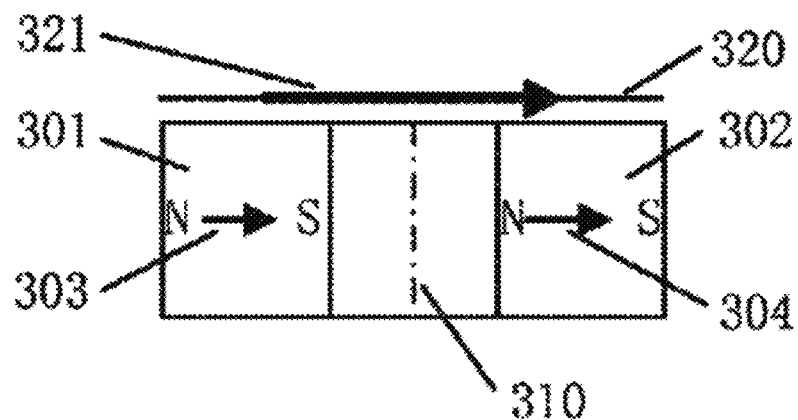
FIG. 4 is a Cross-sectional side view of the permanent magnet shown in FIG. 3.

FIGS. 3 and 4 show schematic drawings of another embodiment of the permanent magnet 300 of the present invention. The permanent magnet 300 has cylindrical ring geometry, and it is comprised of a permanent unit 301 and a permanent magnet unit 302, wherein permanent magnet unit 301 and permanent magnet unit 302 are symmetrically arranged about diametral cross-section 310. The magnetization directions 303 and 304 of permanent magnet units 301 and 302 are oriented along a diameter in the same direction. Preferably, the magnetization 303 of the permanent magnet unit 301 and the magnetization 304 of permanent magnet unit 302 have the same magnitude.

Those skilled in the art can design the permanent magnet 300 into any desired size. Preferably, the permanent magnet 300 is a cylindrical ring with inner diameter 1-100 mm, outer diameter of 3-200 mm, and has an axial length of 1-50 mm.

The detection plane 320 is located in front of and parallel to the end face or permanent magnet 300. Preferably, the detection plane 320 is separated from the end surface of the cylindrical ring by a distance of 1-5 mm. In this patent, the permanent magnet 300 produces a magnetic field component 321 along the detection plane 320. Herein, the detection plane 320 corresponding to the particular detector region 322 located within the cylindrical ring from the axial region specific radius, in particular the magnetic field components 321 within the detection area will have an angle that varies linearly with respect to the angle of the permanent magnet 100, which will be specifically described hereinafter.

Preferably, the composition of the permanent magnet material 300 is Alnico. Alternatively, the permanent magnet 300 is a ferrite ceramic material such as $MO \cdot 6Fe_2O_3$, M is Ba, Sr or combinations of both. Alternatively, the composition of the permanent magnet 100 is $RECo_5$, RE=Sm and/or Pr; $RE_2TM_{17}$, RE=Sm, TM=Fe, Cu, Co, Zr and/or Hf; or $RE_2TM_{14}B$, RE=Nd, Pr, and/or Dy, TM=Fe and/or Co. Alternatively, the permanent magnet material 100 composed of an alloy of NbFeB or FeCrCo. Alternatively, the permanent magnet 300 is composed of the permanent magnet powder embedded in plastic, rubber, or resin composite.

Example 3

Example 3 of the present invention is a magnetic angle encoder that includes a rotating counting wheel that rotates about an axis, a permanent magnet embedded in the counting wheel, magnetic tunnel junction sensors, and digital processing circuitry. Tunneling magnetoresistance sensors are located in the detection plane adjacent to the permanent magnet, for sensing the magnetic field from the permanent magnet and outputting a signal. The tunneling magnetoresistive sensors are disposed at a certain radial distance from rotation axis within the detection plane of the permanent magnets, in this particular radial region of the detection plane of the rotating permanent magnet the magnetic field components have an angle $\phi$ that varies linearly with the rotation angle $\alpha$ of said permanent magnet. A digital processing circuit uses the output signal from the tunneling magnetoresistive sensors to calculate and output a code representative of the rotational angle of the permanent magnet.

Figure 5:
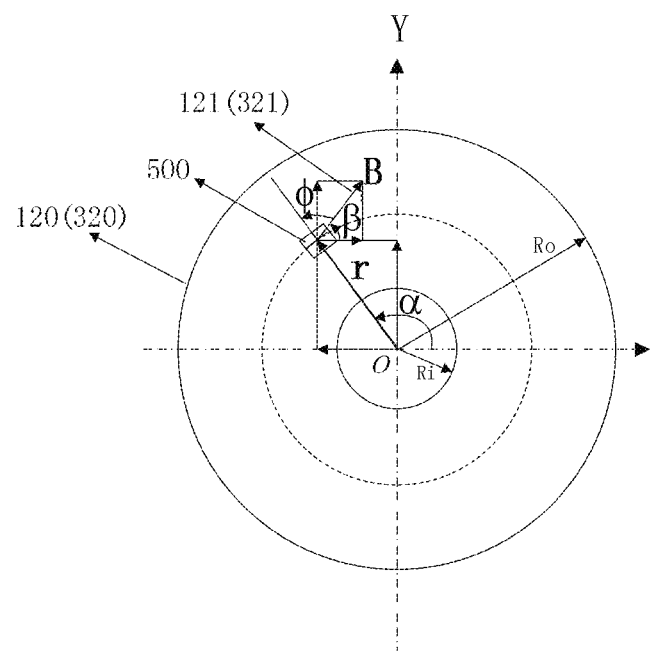
FIG. 5 shows the relative position of a tunneling magnetoresistive sensor with respect to the permanent magnet of the present invention.
Figure 6:
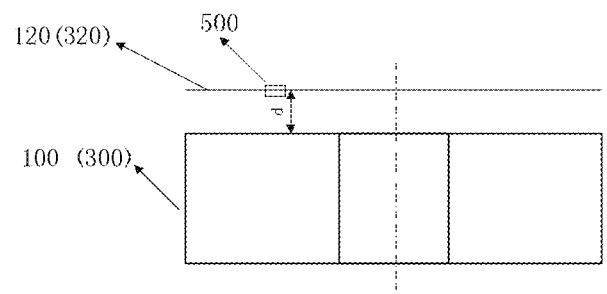
FIG. 6 shows a side cross-sectional view of the relative position of a tunneling magnetoresistive sensor with respect to the permanent magnet of the present invention.

FIGS. 5 and 6 are top and side views of the present invention, showing the detection plane of the permanent magnets 100, 300 and the tunneling magnetoresistive sensor mounting position 500 at a distance d from the end face 120, 320 of the permanent magnet. Here the permanent magnet detection plane 120 has the rotation axis of the permanent magnet 320 as the origin of an XY coordinate system, as shown in FIG. 5. The cylindrical ring permanent magnet 100, 300 has inner radius $R_i$, outer radius $R_o$, and thickness t; A tunneling magnetoresistive sensor 500 detects the direction of the vector magnetic field at a point r(x, y), in the plane 120, 320 with respect to X-axis, and this direction is defined by angle α. It is assumed that the magnetic field components at r are denoted Bxy (Bx, By) and define rotation angle β. The relationship necessary to calculate the angles α and β are as follows:

$\alpha = a\tan(y/x)$ $(x>0)$ $\alpha = a\tan(y/x)+\pi$ $(x<0, y>0)$ $\alpha = a\tan(y/x)-\pi,$ $(x<0, y>0)$ $\beta = a\tan(By/Bx)$ $(Bx>0)$ $\beta = a\tan(By/Bx)+\pi$ $(Bx<0, By>0)$ $\beta = a\tan(By/Bx)-\pi$ $(Bx<0, By<0),$ with α and β in the range of (−180°, 180°).

Tunneling magnetoresistive sensor 500 detect the magnetic field Bxy in order to determine angle φ=β−α.

In normal operation of the magnetic encoder, the angle the tunneling magnetoresistive sensor 500 remains fixed, while the permanent magnets 100, 300 rotate about the axis of rotation, the axis is the origin of the measurement plane, r is the radius from the origin to the tunneling magnetoresistive sensor 500, the rotating magnet generates a rotating magnetic field the phase and amplitude of which are measured by a tunneling magnetoresistive sensor 500. This is equivalent to the permanent magnets 100, 300 remaining fixed, and the tunneling magnetoresistive sensor 500 rotated around the circumference to measure the magnetic fields. In this case, the permanent magnet's angle is α, and the angle of the rotating magnetic field is φ.

Figure 7:
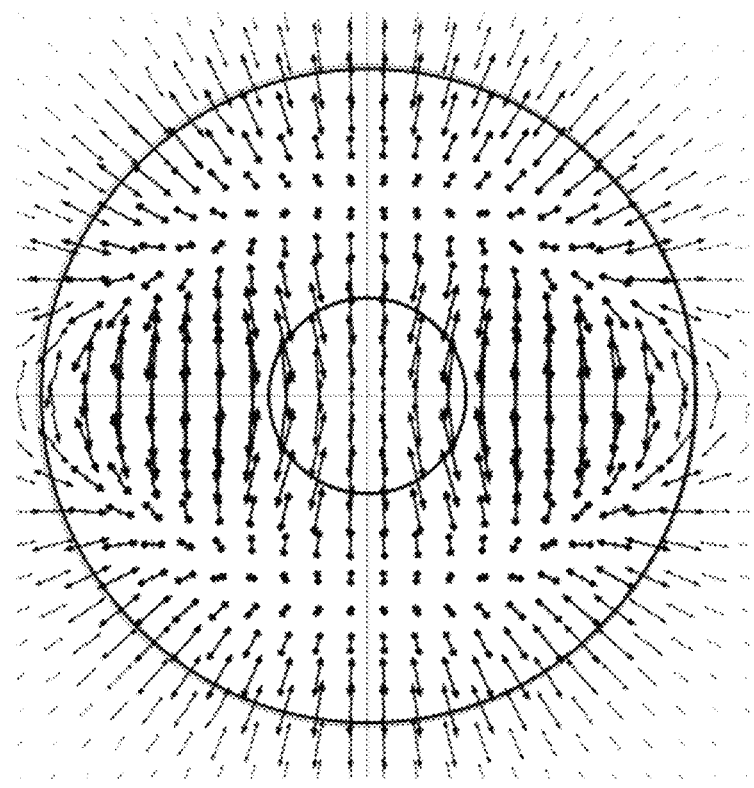
FIG. 7 shows the vector magnetic field distribution in the sensing plane of the permanent magnet design given in Example 1.
Figure 8:
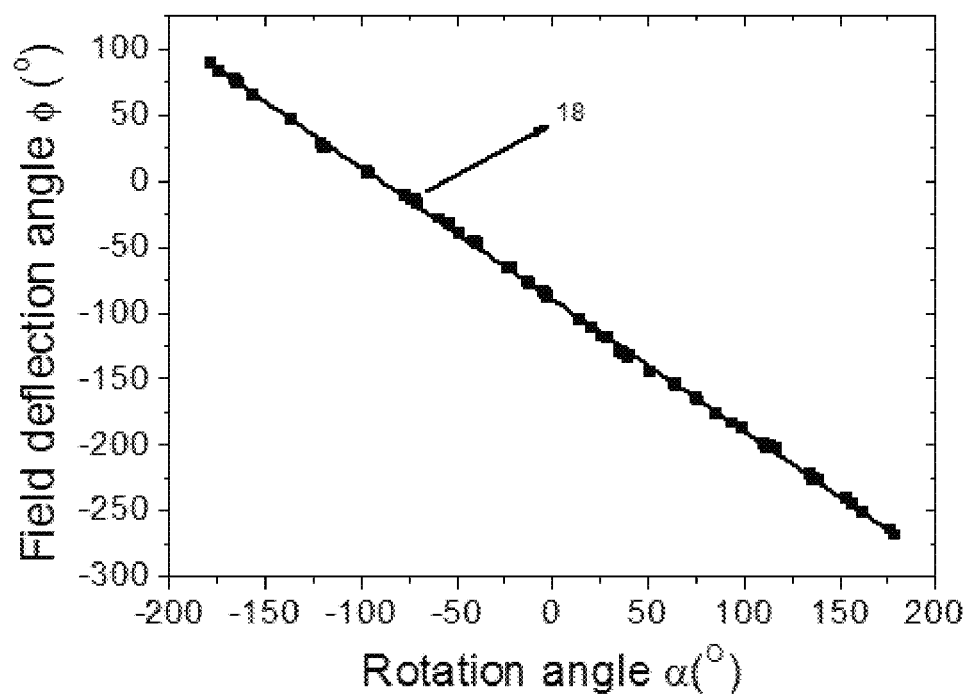
FIG. 8 shows the linear relationship between the magnetic angle ɸ detected in the detection plane and the rotational angle α permanent magnet for the rotating magnet of Example 1.
Figure 9:
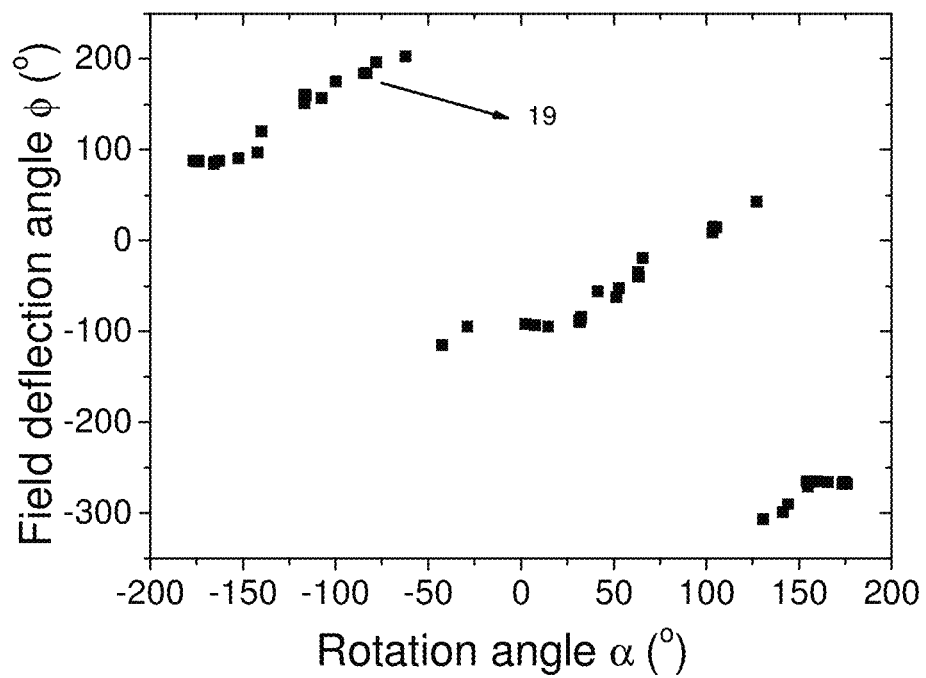
FIG. 9 shows a case with non-linear relationship between the magnetic angle ɸ detected in the detection plane and the rotational angle α permanent magnet for the rotating magnet of Example 1.
Figure 10:
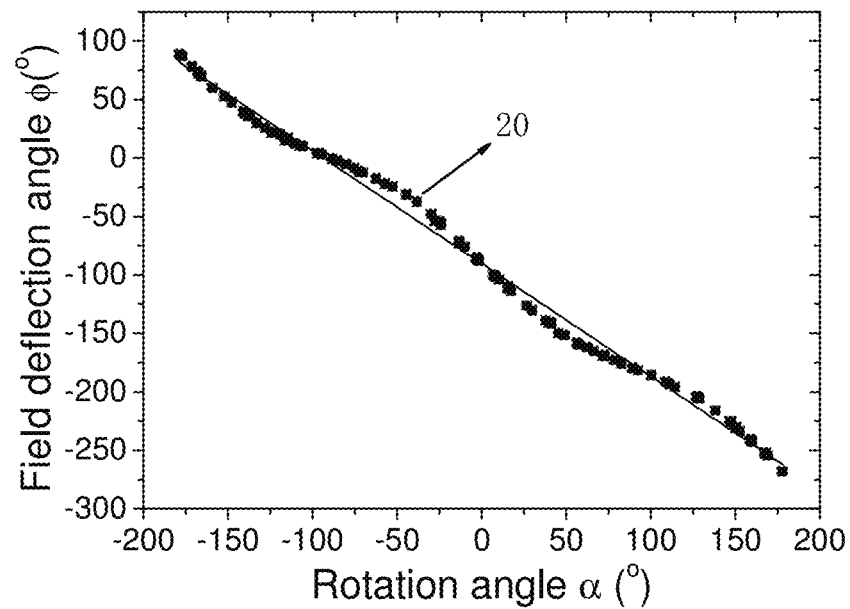
FIG. 10 shows another case with non-linear relationship between the magnetic angle ɸ detected in the detection plane and the rotational angle α permanent magnet for the rotating magnet of Example 1.
Figure 11:
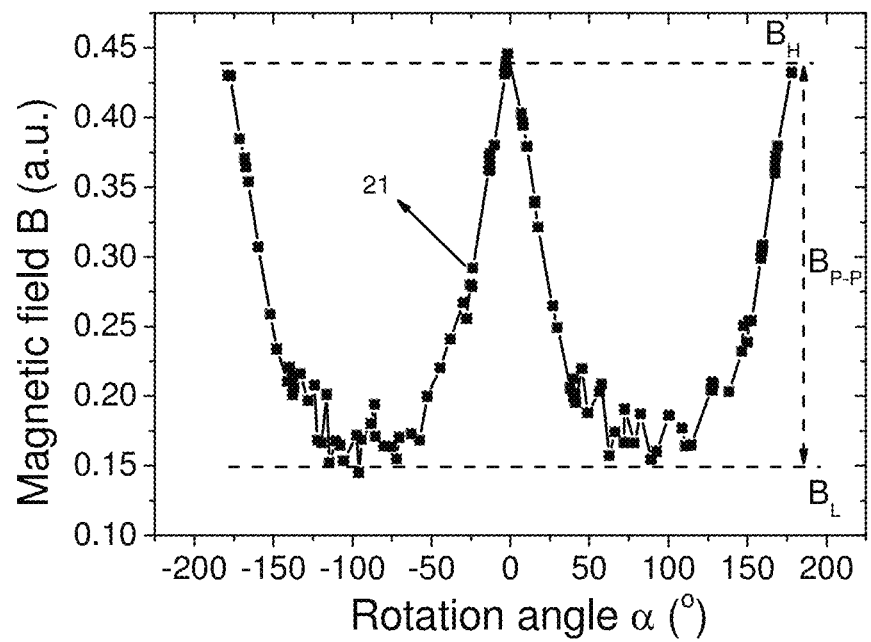
FIG. 11 shows the Bxy magnetic field magnitude at the detection plane as a function of permanent magnet rotation phase angle α for example 1.

FIG. 7 shows the magnetic field vector distribution in the detection plane 120 for permanent magnet 100. In this detection plane 120, the two-dimensional magnetic field Bxy is calculated, here, r can be varied within the range (0, $R_o$) and the relationship between the phase angle φ of the magnetic field and the phase angle relationship a of the rotating permanent magnet can be obtained; the relationship between the angles can be linear or non-linear. For example, FIG. 8 shows the curve 18 of the rotating magnetic field of the permanent magnet and illustrates that the angle φ of the magnetic field can be a linear function of α, whereas FIG. 9 shows the phase curve 19 for the rotating magnetic field of the permanent magnet illustrates a case where the angle φ depends non-linearly and discontinuously on angle α. Also, as shown in FIG. 10 the curve 20 representing the relationship between the permanent magnet angle α and the magnetic angle φ may have varying degrees of nonlinearity with or without discontinuity. FIG. 11 is a plot illustrating the dependence of the magnitude of Bxy as a function of rotation angle α, which is denoted as curve 21. As can be seen from the curve 21, the magnitude of the rotating magnetic field has W-shaped angular variation, with maximum and minimum values corresponding to BH and BL. For a magnetoresistive angle sensor, it is preferred to have the variation in the magnetic field amplitude be as small as possible, in order to guarantee sensor signal accuracy.

A linear fit may be applied to the φ and α curves shown in FIGS. 8, 9, 10 in order to calculate the $R^2$ fitting parameter, where $R^2$ indicates stronger linear behavior as it approaches a value of 1.

The degree of variation in the magnitude of B 21 can be characterized using the following relationship:

$\text{NORMALIZED}\_B = B_{pp}/B_L = (B_H - B_L)/B_L$ where smaller values of NORMALIZED_B, indicate smaller magnetic field variation.

To determine the degree of nonlinearity between the magnetic field angle φ and the rotating magnetic field α in the detection plane, a curve fit be performed on the φ versus α curves at various values of r between (0, Ro), and additionally magnetic field variation as a function α that is NORMALIZED_B can be plotted in the same way.

Figure 12:
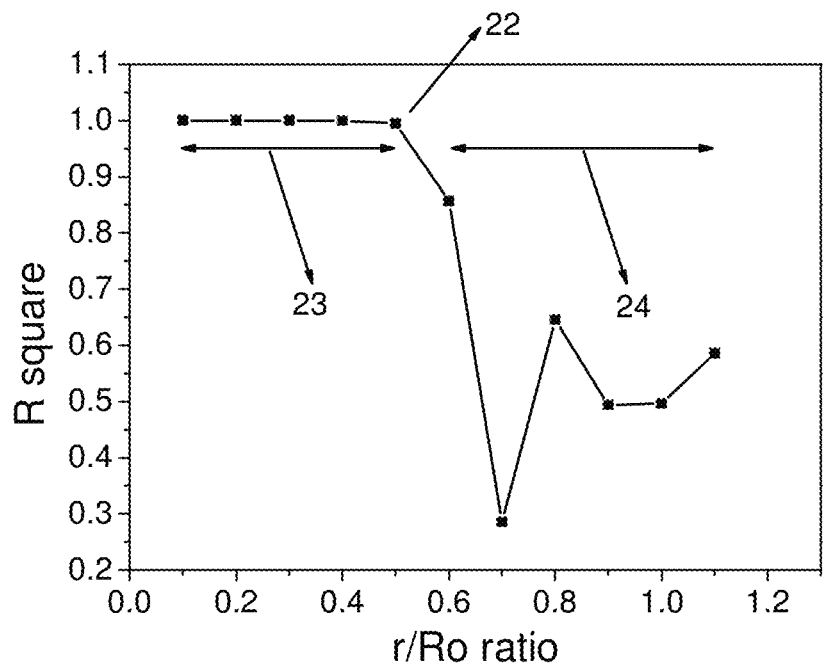
FIG. 12 shows the fit parameter $R^2$ for the linear fit to the magnetic angle ɸ detected in the detection plane and the rotational angle α permanent magnet for the rotating magnet of Example 1 as a function of the relative position of the tunneling magnetoresistive sensor from the rotation axis, $r/R_o$.

FIG. 12 shows linear fit parameter $R^2$ plotted as a function of $r/R_o$. As can be seen from the curve 22, there is a region 23 with value is close to 1, indicating that in this region the angle φ of rotating magnetic field and the angle φ of the permanent magnet have near-linear relationship. A tunneling magnetoresistive sensor used in area 23 of the detection plane 120 corresponding to the inner surface of the magnet 100. This region is well suited for the tunneling magnetoresistive sensor 500, but region the region 24 is not well suited for the tunneling magnetoresistive sensor 500.

Figure 13:
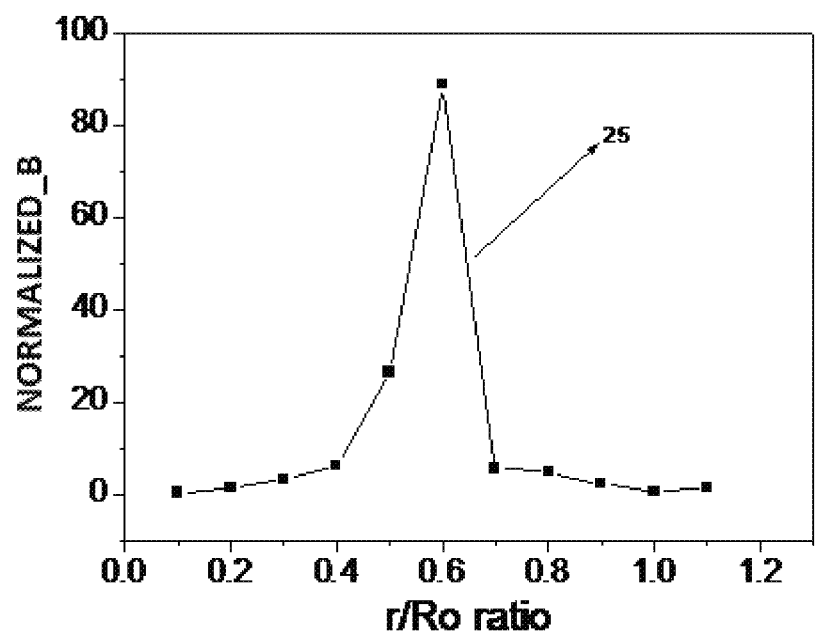
FIG. 13 shows the normalized magnetic field component detected by the tunneling magnetoresistive sensor as a function of relative distance $r/R_o$ from the rotation axis of the permanent magnet defined in example 1.

FIG. 13 shows a curve NORMALIZED_B as a function of the relative position $r/R_o$ of the tunneling magnetoresistive sensor 500 within the detection plane 120. As can be seen from the curve 25 for a portion of region 23 the magnetic field variation for the tunneling magnetoresistive sensor 500 is sufficiently small for good performance to be obtained.

Example 4

Example 4 provides another implementation of the magnetic encoder of the present invention, including a permanent magnet structure that rotates about an axis of rotation as described in Example 2, a tunneling magnetoresistive sensor, and digital processing circuits. In addition to the permanent magnet, other features that are the same as those in Example 3 are omitted in the description of Example 4.

Figure 14:
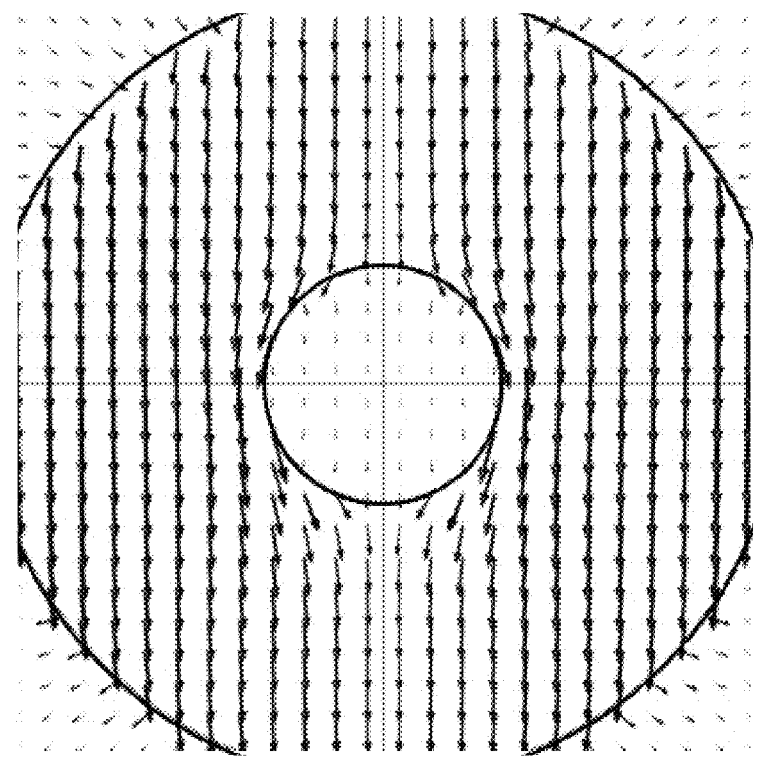
FIG. 14 shows the vector magnetic field distribution in the sensing plane of the permanent magnet design given in Example 2.
Figure 15:
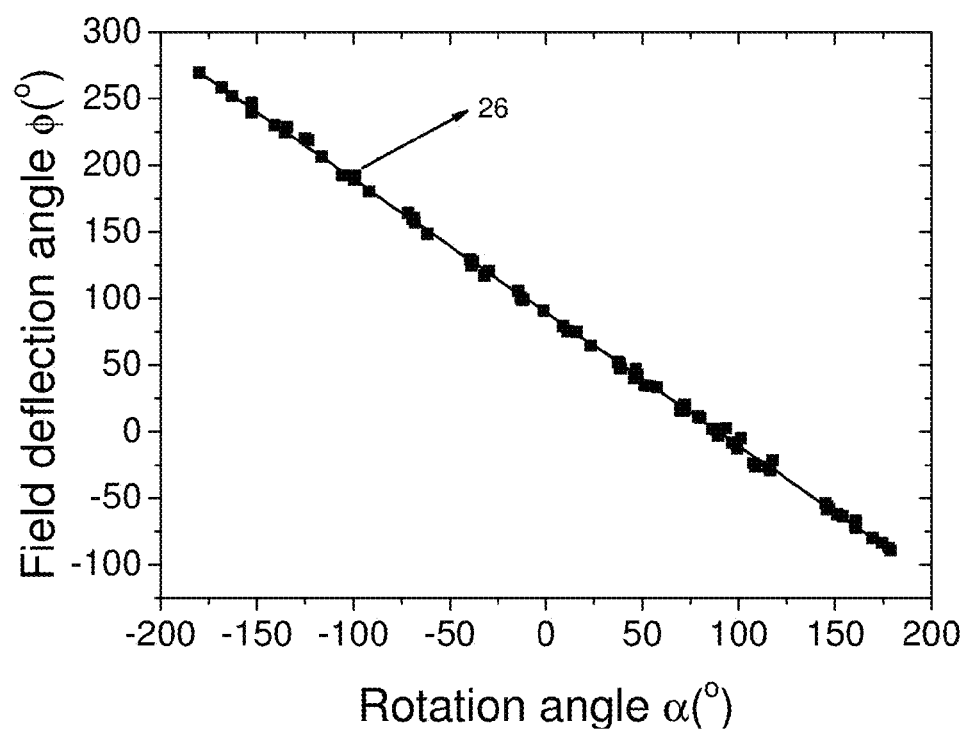
FIG. 15 shows the linear relationship between the magnetic angle ɸ detected in the detection plane and the rotational angle α permanent magnet for the rotating magnet of Example 2.
Figure 16:
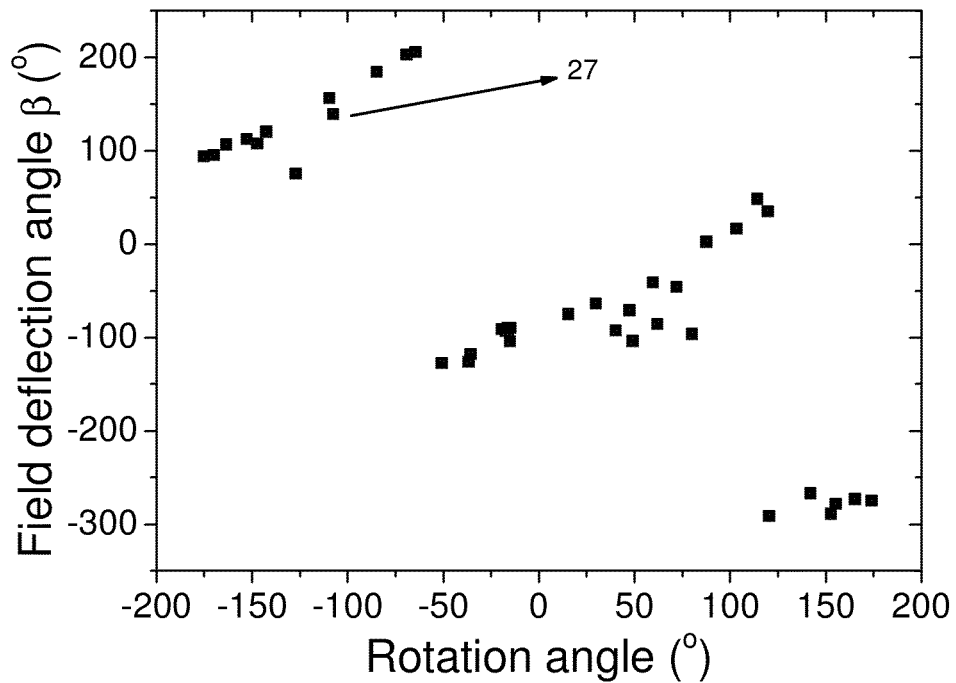
FIG. 16 shows a case with non-linear relationship between the magnetic angle ɸ detected in the detection plane and the rotational angle α permanent magnet for the rotating magnet of Example 2.
Figure 17:
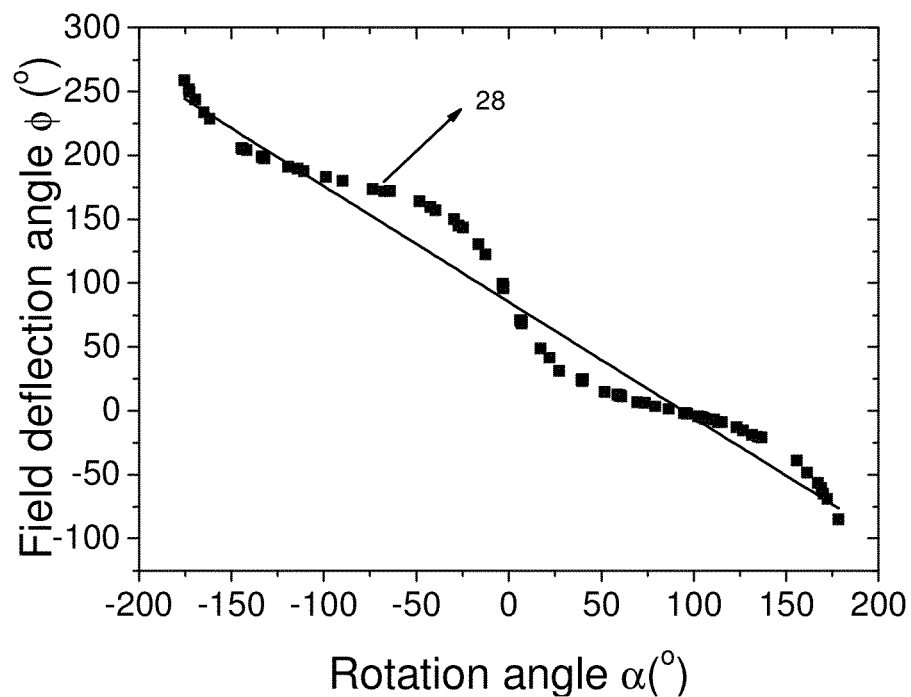
FIG. 17 shows another case with non-linear relationship between the magnetic angle ɸ detected in the detection plane and the rotational angle α permanent magnet for the rotating magnet of Example 2.

FIG. 14 shows the magnetic field vector distribution in the detection plane 320 for permanent magnet 300. In this detection plane 320, the two-dimensional magnetic field Bxy is calculated. As shown in FIGS. 15, 16, 17 within the detection plane 320 angle φ of the rotating magnetic field and angle α of the permanent magnet may have a linear relationship as in curve 26, a non-linear discontinuous relationship as shown in curve 27, and intermediate degrees of linearity as shown in curve 28. There is a linearity of curve 26 indicates a linear relationship between the rotating magnetic field angle φ and angle α of the permanent magnets of the permanent magnet 300 in the detection plane, such that the angle of the permanent magnets can be determined usefully for application as a magnetic encoder.

Figure 18:
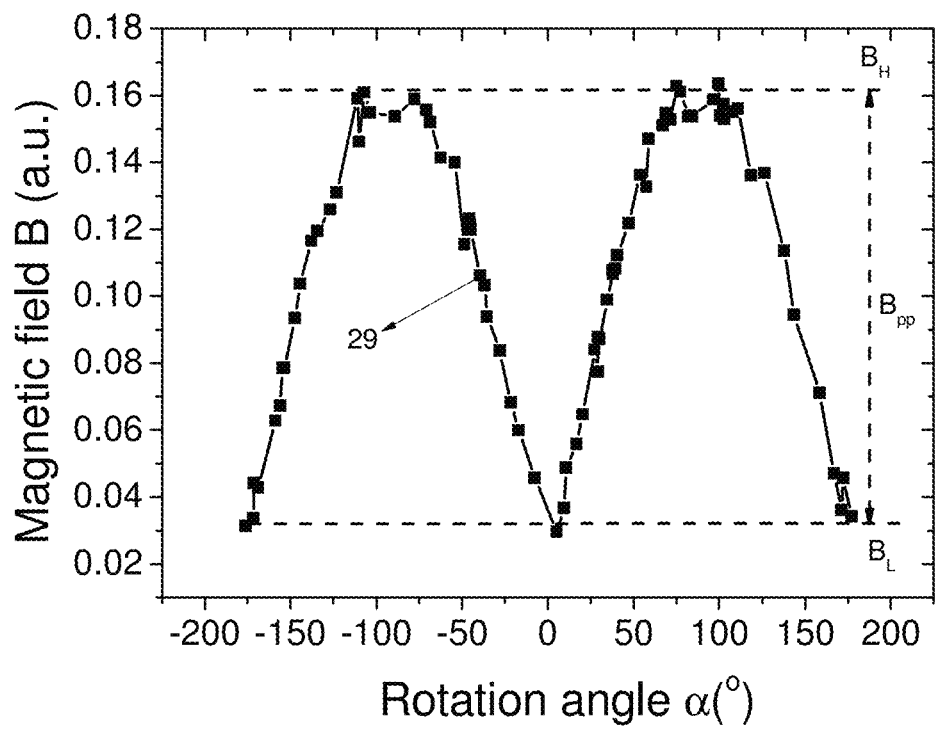
FIG. 18 shows the Bxy magnetic field magnitude at the detection plane as a function of permanent magnet rotation phase angle α for example 2.

FIG. 18 shows the magnitude variation of the rotating magnetic field Bxy as a function of the permanent magnet rotation angle α. It can be seen from this curve 29, that the rotating magnetic field Bxy has an M-shaped periodic variation as a function of the permanent magnet's angle α.

Figure 19:
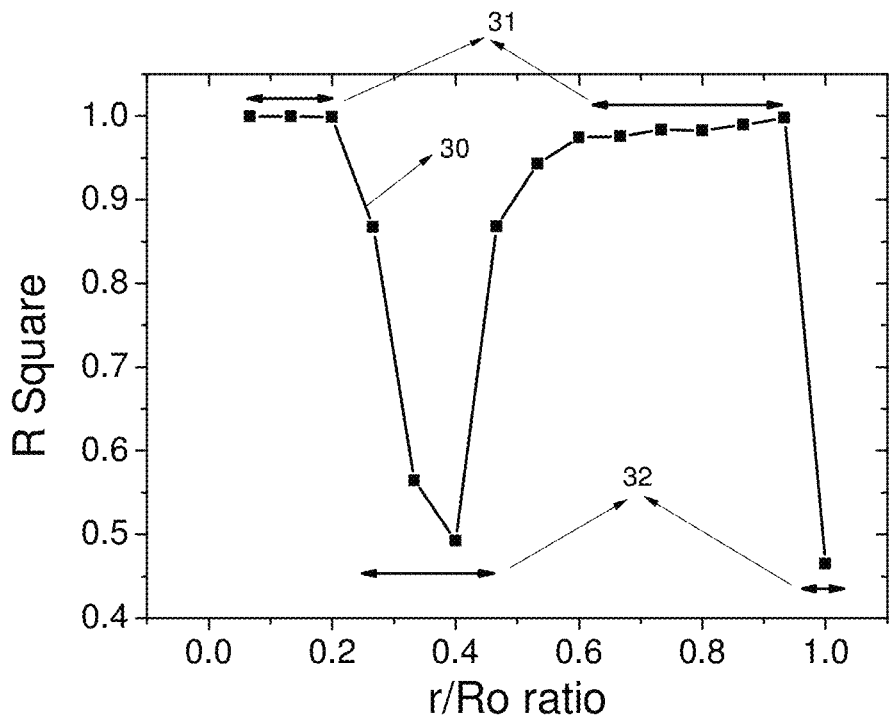
FIG. 19 shows the fit parameter $R^2$ for the linear fit to the magnetic angle ɸ detected in the detection plane and the rotational angle α permanent magnet for the rotating magnet of Example 2 as a function of the relative position of the tunneling magnetoresistive sensor from the rotation axis, $r/R_o$.
Figure 20:
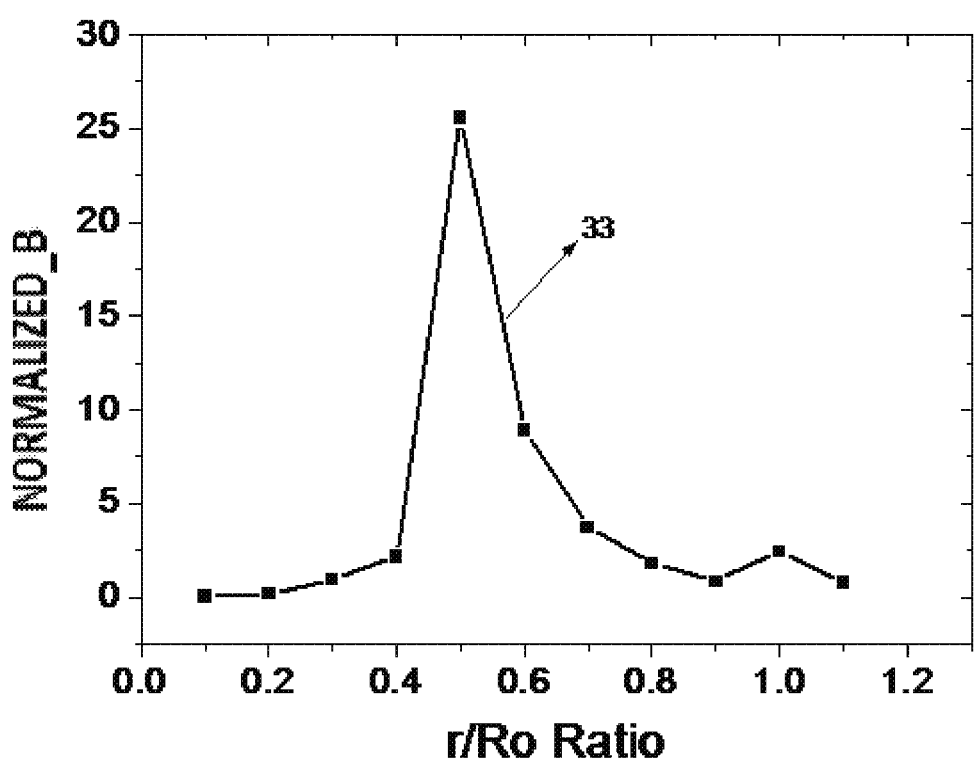
FIG. 20 shows the normalized magnetic field component detected by the tunneling magnetoresistive sensor as a function of relative distance $r/R_o$ from the rotation axis of the permanent magnet defined in example 2.

Similarly, in order to determine the range of linear area within the test surface 320, the φ−α curve fitting parameters can be obtained at different relative positions $r/R_o$, as shown in FIG. 19 the $R^2$ fit parameter which indicates linearity, is plotted as curve 30, the portion 31 of the detection plane 320 is best suited for a tunneling magnetoresistive sensor 500, whereas region 32 is not well suited for a tunneling magnetoresistive sensor 500. Further, it can be seen from FIG. 20, which shows NORMALIZED_B as a function of the relative position $r/R_o$ of the tunneling magnetoresistive sensor 500 identified as curve 33 coincides with region 31 is small compared to region 32 which is the non-ideal operating area.

The above analysis shows that permanent magnets 100 and 300, have a detection plane 120 and 320, in which there is a specific detection zone 23 and 31, suitable for using a tunneling magnetoresistive sensor 500 to measure the angle ϕ of the rotating magnetic field of a permanent magnet. In these regions, there is a linear relationship with permanent magnet angle α, and the variation of the magnetic field magnitude is small enough to meet the requirements of the sensor. Thus, the rotation angle of the magnetic field measured by a tunneling magnetoresistive sensor can be converted into the rotation angle of the permanent magnet by the digital processing circuit in order to calculate and output a code representing the rotational angle of the permanent magnet, suitable for use in magnetic angle encoders. Different implementations of the present invention may be used as magnetic angle encoders that can be applied to electronic water meters, and various other applications.

Example 5

Figure 21:
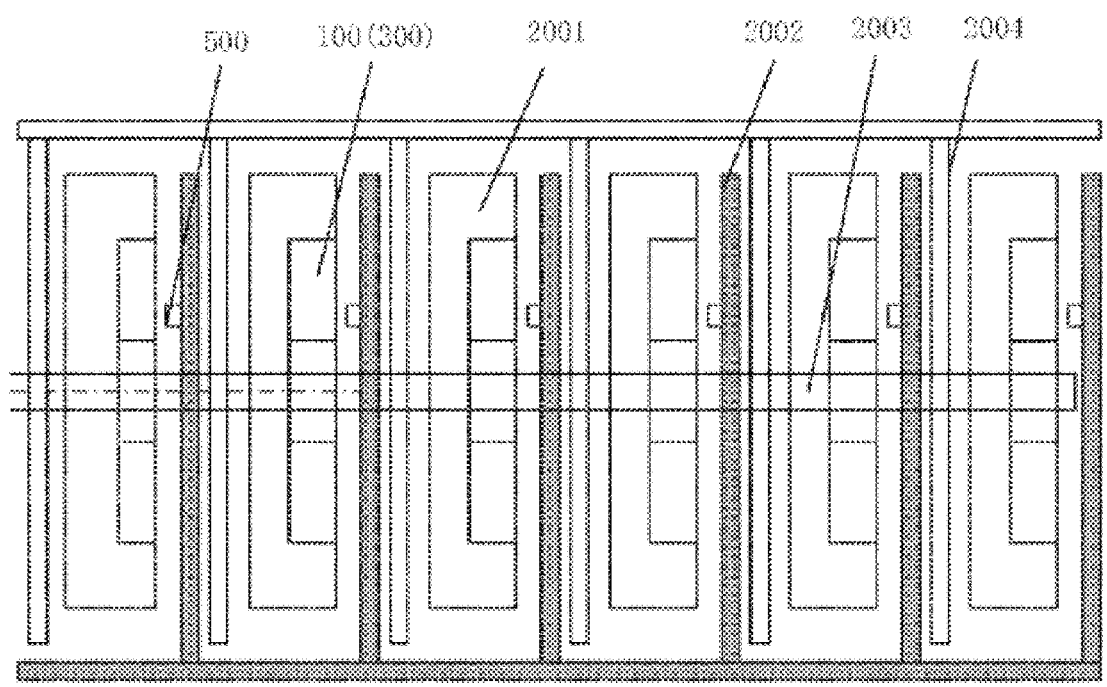
FIG. 21 shows a schematic diagram of an implementation of an electronic water meter.

FIG. 21 shows the installation of permanent magnets 100 or 300 for a magnetic angle encoder configuration configured for use with an electronic water meter 21. The following description combines the permanent magnet of example 1 with the magnetic encoder of example 4 in order to provide an electronic water meter of the present invention. The electronic water meter includes a central shaft and at least one magnetic angle encoder. When the electronic water meter magnetic encoder includes a plurality of angle encoders, the various angle encoders rotate a different number of revolutions compared to revolutions of the shaft with the number of revolutions being related to the priority of the angle encoder.

For example, the permanent magnet 100 is a cylindrical ring structure, and the permanent magnet comprises permanent magnet units 101 and 102, symmetrically placed with respect to diametral the cross-section 110, and corresponding magnetization directions 103 and 104 aligned in the axial direction wherein the magnetizations of permanent units 101 and 102 are aligned antiparallel and have the same magnitude.

Each magnetic angle encoder has permanent magnet 100 with an outer diameter of the 3-20 mm, an inner diameter of 1-15 mm, and an axial length of 1.5-10 mm, wherein the permanent magnets 100 are embedded in counting wheels 2001, the counting wheels rotate around the central axis 2003. Further they contain a tunneling magnetoresistive sensor 500 mounted in a detection plane 120 within 1-5 mm from the end surface of the permanent magnet 100 within a relative $r/R_o$ corresponding to detection area 23, and within this detection area, detecting the magnetic field components necessary to measure the angle ϕ of the rotating magnetic field linearly representative of the permanent magnet's angle. Vector 121 is a magnetic field component detected in the detection plane 120. Tunneling magnetoresistive sensor 500 is located on a printed circuit board 2002, which sends the signal output by the circuit board 2002. Counting wheels 2001 are installed on central axis 2003, and the printed circuit board 2002 is attached to the water meter frame 2004. Utilizing magnetic field component 121 obtained with tunneling magnetoresistive sensor 500 and the linear relationship between magnetic field angle ϕ and permanent magnet rotation angle α, the angle α can be measured. The magnetic field angle measured using a tunneling magnetoresistive sensor can then be converted into the counting wheel rotation angle by the digital processing circuit, and a code characterizing this angle can be output.

Several magnetic encoders are placed and counting wheels are placed on a shaft and used to read different digits, where neighboring wheels have a 10:1 gear ratio. Each wheel's angular displacement is related to the magnet rotation angle α, by using pairs of tunneling magnetoresistive sensors 5 to measure the rotating magnetic field of a magnet attached to a counting wheel the angle of the wheel may be calculated. Each counting wheel's range of 0~360° is divided into ten equal increments representing the ten digits, such that it is possible to build a relationship between the angular displacement and the numbers, and then a printed circuit board 2002 may be used to convert these signals into a digital code. By reading the numbers on the different counting wheels, it is possible to directly get a reading of the value of the electronic water meter.

An electronic water meter may be equipped with permanent magnets type 100 or 300. When using cylindrical ring permanent magnet 300, it may be comprised of permanent magnet units 301 and 302 each having the same magnetization magnitude, oriented along the direction perpendicular to the diametral cross-section 310. Permanent magnet 300 has an outer radius of 5-20 mm, and inner radius of 1-5 mm, and a thickness along the axial direction of 1-5 mm. The tunneling magnetoresistive sensor 500 is placed a distance 1-5 mm along the axis from the permanent magnet 300 in the sensing plane, and spaced at a radial distance of $r/R_o$ from the axis into inner detection area 31, in this specific region, the magnetic field rotation angle ϕ is linearly related to the rotation angle α of the magnet. Magnetic field component 321 is measured in detection plane 320. The remaining procedure is the same as that for an electronic water meter using permanent magnet 100.

The above described preferred embodiments of the present invention do not limit the possible variations of the invention, and those skilled in the art can make various modifications and changes that do not exceed the scope of the invention. Any modification made within the spirit and principle of the present invention by replacement with equivalent or improved features falls within the scope of the present invention.

The invention claimed is:

1. A magnetic angle encoder, comprising:
   a permanent magnet having an end face, the permanent magnet configured to provide a magnetic field in a detection plane adjacent and parallel to the end face, the permanent magnet including:
      a cylindrical ring permanent magnet having an inner radius $R_i$ and an outer radius $R_o$, the cylindrical ring permanent magnet including a first permanent magnet unit having a first direction of magnetization and a second permanent magnet unit having a second direction of magnetization,
      wherein the cylindrical ring permanent magnet has a diametrical cross-section and the first and second permanent magnet units are symmetrically placed on opposite sides of the diametrical cross-section; and a magnetoresistance sensor in a detection region of the detection plane at a radial distance r from a center of the cylindrical ring permanent magnet,
wherein:
the first direction of magnetization and the second direction of magnetization are aligned along the axial direction of the cylindrical ring in antiparallel directions, and the detection region is defined by a ratio of the radial distance r to the outer radius Ro, where $r/R_o<0.2$ or where $0.5<r/R_o<0.95$, or
the first and second directions of magnetization are aligned perpendicular to the diametrical cross-section, and aligned parallel to the each other, and the detection region is defined by a ratio of the radial distance r to the outer radius Ro, where $r/R_o$ $r/Ro<0.5$.

2. The magnetic angle encoder of claim 1, wherein the magnetization of the first permanent magnet unit and the magnetization of the second permanent magnet unit are the same size.

3. The magnetic angle encoder of claim 1, wherein the outer diameter of the cylindrical ring permanent magnet is between 3 and 200 mm.

4. The magnetic angle encoder of claim 1, wherein the inner diameter of the cylindrical ring permanent magnet is between 1 and e100 mm.

5. The magnetic angle encoder of claim 1, wherein the axial length of the cylindrical ring permanent magnet is between 1 and 50 mm.

6. The magnetic angle encoder of claim 1, wherein the cylindrical permanent magnet has a detection plane located adjacent and parallel to a cylindrical end face of the permanent magnet.

7. The magnetic angle encoder of claim 6, wherein the distance between the detection plane and the cylindrical ring end face is 1 to 5 mm.

8. The magnetic angle encoder of claim 1, wherein the magnetic field from the permanent magnet has a component in the detection plane.

9. The magnetic angle encoder of claim 1, further comprising a specific detection area located within the detection plane and within a specified distance along the cylindrical ring radius from the axis, wherein the rotational angle ($\phi$) of the magnetic field components within the specific detection area varies linearly with the rotational angle ($\alpha$) of the permanent magnet.

10. The magnetic angle encoder of claim 1, wherein the permanent magnet is composed of Alnico.

11. The magnetic angle encoder of claim 1, wherein the permanent magnet is composed of a ceramic ferrite material with composition $MO.6Fe_2O_3$, and M is Ba, Sr, or combinations of both.

12. The magnetic angle encoder of claim 1, wherein the permanent magnet is composed of an alloy with composition $RECo_5$, where RE=Sm and/or Pr; $RE_2TM_{17}$, where RE=Sm, TM=Fe, Cu, Co, Zr and/or Hf; or $RE_2TM_{14}B$, where RE=Nd, Pr and/or Dy, TM=Fe and/or Co.

13. The magnetic angle encoder of claim 1, wherein the permanent magnet is composed of an alloy NbFeB or FeCrCo.

14. The magnetic angle encoder of claim 1, wherein the permanent magnets are comprised of permanent magnet powder embedded in plastic, rubber, or a resin composite.

15. The magnetic angle encoder of claim 14, wherein the permanent magnet powder is comprised of any of various permanent magnetic materials including $MO.6Fe2O3$, where M is Ba, Sr or combinations of both; $RECo_5$, RE=Sm and/or Pr; $RE_2TM_{17}$, RE=Sm, TM=Fe, Cu, Co, Zr and/or Hf; or $RE_2TM_{14}B$, where RE=Nd, Pr, and/or Dy, TM=Fe and/or Co; or an alloy of NbFeB or FeCrCo; and the permanent magnet powder is embedded in plastic, rubber, or resin composite.

16. A magnetic angle encoder, comprising:
a permanent magnet having an end face, the permanent magnet configured to provide a magnetic field in a detection plane adjacent and parallel to the end face, the permanent magnet including:
a cylindrical ring permanent magnet including two permanent magnet units, the two permanent magnet units includes a first permanent magnet unit and a second permanent magnet unit, the cylindrical ring permanent magnet having an inner radius $R_I$ and an outer radius $R_O$, the cylindrical ring permanent magnet including a first permanent magnet unit having a first direction of magnetization and a second permanent magnet unit having a second direction of magnetization,
wherein the cylindrical ring permanent magnet has a diametrical cross-section and the first and second permanent magnet units are symmetrically placed on opposite sides of the diametrical cross-section, and
wherein the first permanent magnet unit and second permanent magnet unit have directions of magnetization aligned in parallel with each other and aligned perpendicular to the diametrical cross-section; and
a magnetoresistance sensor in a detection region of the detection plane at a radial distance r from a center of the cylindrical ring permanent magnet, wherein the detection region and the detection region is defined by a ratio of the radial distance r to the outer radius Ro, where $r/Ro<0.5$.

17. The magnetic angle encoder of claim 16, wherein the cylindrical ring permanent magnet includes two permanent magnet units, the two permanent magnet units including the first and the second permanent magnet units.

18. A permanent magnet suitable for a magnetic angle encoder, comprising:
a cylindrical ring permanent magnet including two permanent magnet units, the two permanent magnet units include a first permanent magnet unit and a second permanent magnet unit,
wherein the cylindrical ring permanent magnet has a diametrical cross-section and the first and second permanent magnet units are symmetrically placed on opposite sides of the diametrical cross-section, and
wherein the first permanent magnet unit and the second permanent magnet unit have a magnetization that is aligned along the axial direction of the cylindrical ring, and in antiparallel directions.

19. The permanent magnet of claim 18, wherein the cylindrical ring permanent magnet has an end face and further has an inner radius $R_i$ and an outer radius $R_o$, the cylindrical ring permanent magnet, the permanent magnet configured to provide a magnetic field in a detection plane adjacent and parallel to the end face, and provide a detection region in a detection plane for a magnetoresistance sensor, the detection region is defined by a ratio of the radial distance r to the outer radius Ro, where $r/R_o<0.2$ or where $0.5<r/R_o<0.95$.

20. The permanent magnet of claim 18, wherein the cylindrical ring permanent magnet includes two permanent magnet units, the two permanent magnet units including the first and the second permanent magnet units.

* * * * *

UNITED STATES PATENT AND TRADEMARK OFFICE
CERTIFICATE OF CORRECTION

PATENT NO.         : 9,715,959 B2
APPLICATION NO.    : 14/758447
DATED              : July 25, 2017
INVENTOR(S)        : Deak et al.

It is certified that error appears in the above-identified patent and that said Letters Patent is hereby corrected as shown below:

On the Title Page

Item (71), in "Applicant", in Column 1, Line 2, after "Zhangjiagang", insert --, Jiangsu--

Item (72), in "Inventors", in Column 1, Line 1, after "Zhangjiagang", insert --, Jiangsu--

Item (72), in "Inventors", in Column 1, Line 2, after "Zhangjiagang", insert --, Jiangsu--

Item (30), in "Foreign Application Priority Data", in Column 1, Line 1, delete "2013 1 0002591" and insert --201310002591.1-- therefor On page 2, in Column 2, under "Foreign Patent Documents", Line 1, delete "H0328407" and insert --H03283407-- therefor In the Claims In Column 11, Line 10, in Claim 1, delete "Ro," and insert --$R_o$,-- therefor In Column 11, Line 15-16, in Claim 1, delete "Ro, where r/R$_o$ r/Ro<0.5." and insert --$R_o$, where r/$R_o$ r/$R_o$<0.5.-- therefor In Column 11, Line 25, in Claim 4, delete "e100" and insert --100-- therefor In Column 11, Line 49, in Claim 11, delete "MO.6Fe$_2$O$_3$," and insert --MO·6Fe$_2$O$_3$,-- therefor In Column 11, Line 63, in Claim 15, delete "MO.6Fe2O3," and insert --MO·6Fe$_2$O$_3$,-- therefor In Column 12, Line 14, in Claim 16, delete "R$_i$" and insert --$R_i$-- therefor In Column 12, Line 15, in Claim 16, delete "R$_O$," and insert --$R_o$,-- therefor Signed and Sealed this
Tenth Day of April, 2018

Andrei Iancu
*Director of the United States Patent and Trademark Office*

CERTIFICATE OF CORRECTION (continued)
U.S. Pat. No. 9,715,959 B2

In Column 12, Line 31-32, in Claim 16, delete "Ro, where r/Ro<0.5." and insert --$R_o$, where r/$R_o$<0.5.-- therefor In Column 12, Line 58, in Claim 19, delete "Ro," and insert --$R_o$,-- therefor